(12) United States Patent
Bedard

(10) Patent No.: US 9,188,048 B2
(45) Date of Patent: Nov. 17, 2015

(54) VEHICLE HAVING AN AUXILIARY EXHAUST PIPE

(71) Applicant: BOMBARDIER RECREATIONAL PRODUCTS INC., Valcourt (CA)

(72) Inventor: Yvon Bedard, Orford (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 14/134,645

(22) Filed: Dec. 19, 2013

(65) Prior Publication Data

US 2014/0182961 A1 Jul. 3, 2014

Related U.S. Application Data

(60) Provisional application No. 61/739,945, filed on Dec. 20, 2012.

(51) Int. Cl.
*B60K 13/04* (2006.01)
*F01N 13/08* (2010.01)

(52) U.S. Cl.
CPC .............. *F01N 13/082* (2013.01); *B60K 13/04* (2013.01); *F01N 2260/06* (2013.01); *F01N 2470/02* (2013.01); *F01N 2470/08* (2013.01); *F01N 2470/18* (2013.01); *F01N 2470/24* (2013.01); *F01N 2470/30* (2013.01)

(58) Field of Classification Search
CPC .................. F01N 13/08; F01N 13/082; F01N 13/085–13/107; B60K 13/04
USPC ..................... 60/313, 324; 181/228, 238, 239; 180/309
See application file for complete search history.

(56) References Cited

U.S. PATENT DOCUMENTS

| 5,123,501 | A | * | 6/1992 | Rothman et al. .............. 181/239 |
| 8,056,654 | B2 | | 11/2011 | Rasmussen |
| 2007/0256673 | A1 | * | 11/2007 | Bozmoski et al. ....... 123/568.11 |
| 2011/0272209 | A1 | * | 11/2011 | Tauschek et al. ............. 181/228 |

* cited by examiner

*Primary Examiner* — Jeffrey J Restifo
*Assistant Examiner* — Erez Gurari
(74) *Attorney, Agent, or Firm* — BCF LLP

(57) ABSTRACT

A muffler for an exhaust system of an internal combustion engine has a muffler body, an inlet pipe, a primary exhaust pipe and an auxiliary exhaust pipe. The inlet pipe has an inlet outside the muffler body and an outlet inside the muffler body. The primary exhaust pipe has an inlet inside the muffler body, a main outlet outside the muffler body, and at least one auxiliary outlet defined in a side of the primary exhaust pipe between the inlet and the main outlet of the primary exhaust pipe. The auxiliary exhaust pipe fluidly communicates the at least one auxiliary outlet with an exterior of the muffler. A vehicle having a primary exhaust pipe and an auxiliary exhaust pipe is also disclosed.

23 Claims, 14 Drawing Sheets

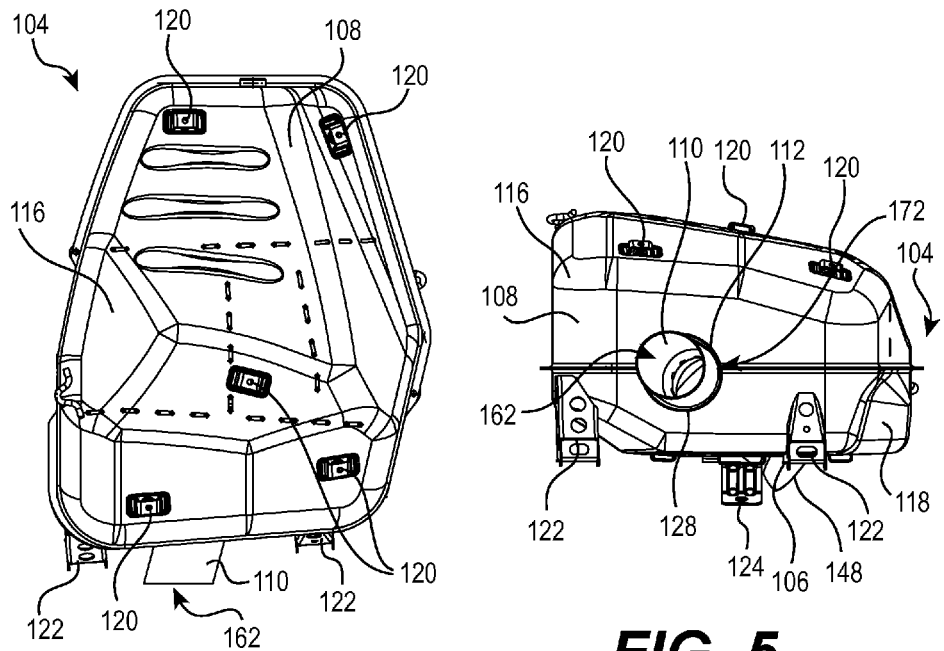
FIG. 4
FIG. 5
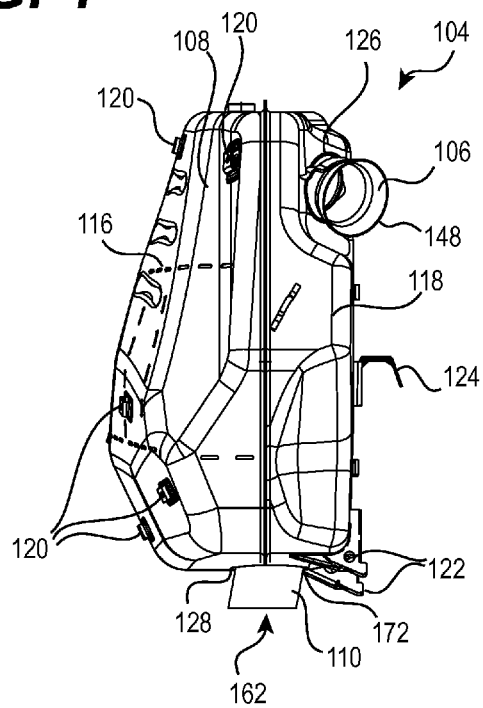
FIG. 6

VEHICLE HAVING AN AUXILIARY EXHAUST PIPE

CROSS-REFERENCE

The present application claims priority to U.S. Provisional Patent Application No. 61/739,945, filed Dec. 20, 2012, the entirety of which is incorporated herein by reference.

FIELD

The present technology relates to a vehicle having an auxiliary exhaust pipe.

BACKGROUND

Vehicles having an internal combustion engine are provided with exhaust systems to deliver the exhaust gases generated by the engine from the engine to the atmosphere.

Depending on the intended use of the vehicle, there is a risk that an outlet of the exhaust system could become blocked. As a result exhaust gases cannot escape the exhaust system, which can affect the operation of the engine and, as the pressure of exhaust gases inside the exhaust system increases, could damage the exhaust system.

In vehicles operating off-road, such as all-terrain vehicles (ATVs) and snowmobiles, it is possible for mud or snow to become lodged in the outlet of the exhaust system, thereby completely or partially blocking the outlet. This can lead to the aforementioned problems.

Therefore, there is a need for a vehicle having an exhaust system that can deliver exhaust gases from the engine even when the outlet of the exhaust system becomes completely or partially blocked.

SUMMARY

It is an object of the present technology to ameliorate at least some of the inconveniences present in the prior art.

In one aspect, embodiments of the present technology provide a muffler for an exhaust system of an internal combustion engine having a muffler body; an inlet pipe having an inlet outside the muffler body and an outlet inside the muffler body; a primary exhaust pipe having an inlet inside the muffler body, a main outlet outside the muffler body, and at least one auxiliary outlet defined in a side of the primary exhaust pipe between the inlet and the main outlet of the primary exhaust pipe; and an auxiliary exhaust pipe fluidly communicating the at least one auxiliary outlet with an exterior of the muffler.

In a further aspect, the at least one auxiliary outlet is disposed inside the muffler body.

In an additional aspect, the auxiliary exhaust pipe is disposed around a portion of the primary exhaust pipe thereby defining a fluid passage between the primary exhaust pipe and the auxiliary exhaust pipe.

In a further aspect, the primary exhaust pipe extends from the auxiliary exhaust pipe and the main outlet is spaced from an outlet of the auxiliary exhaust pipe.

In an additional aspect, the auxiliary exhaust pipe is disposed inside the muffler body.

In a further aspect, an outlet of the auxiliary exhaust pipe is defined in a wall of the muffler body, and the primary exhaust pipe extends from the muffler body.

In an additional aspect, the primary exhaust pipe has a portion defining a venturi, and the at least one auxiliary outlet is defined in the venturi.

In a further aspect, the at least one auxiliary outlet is a plurality of auxiliary outlets.

In an additional aspect, the auxiliary exhaust pipe extends from the at least one auxiliary outlet to the exterior of the muffler. An internal diameter of an outlet of the auxiliary exhaust pipe is smaller than an internal diameter of the main outlet.

In another aspect, embodiments of the present technology provide a vehicle having an internal combustion engine having at least one exhaust port, and a primary exhaust pipe fluidly communicating with the at least one exhaust port. The primary exhaust pipe has an inlet, a main outlet downstream of the inlet, and at least one auxiliary outlet defined in a side of the primary exhaust pipe between the inlet and the main outlet. An auxiliary exhaust pipe is disposed around a portion of the primary exhaust pipe thereby defining a fluid passage between the primary exhaust pipe and the auxiliary exhaust pipe.

In a further aspect, the primary exhaust pipe extends from the auxiliary exhaust pipe and the main outlet is spaced from an outlet of the auxiliary exhaust pipe.

In an additional aspect, the primary exhaust pipe has a portion defining a venturi, and the at least one auxiliary outlet is defined in the venturi.

In a further aspect, a muffler fluidly communicates with the at least one exhaust port of the engine. The muffler has a muffler body. The inlet of the primary exhaust pipe is disposed inside the muffler body.

In an additional aspect, the at least one auxiliary outlet is disposed inside the muffler body.

In a further aspect, the auxiliary exhaust pipe is disposed inside the muffler body.

In an additional aspect, an outlet of the auxiliary exhaust pipe is defined in a wall of the muffler body, and the primary exhaust pipe extends from the muffler body.

In a further aspect, the vehicle has an engine compartment. The engine and an outlet of the auxiliary exhaust pipe are disposed inside the engine compartment. The main exhaust outlet is disposed outside the engine compartment.

In yet another aspect, embodiments of the present technology provide a vehicle having an internal combustion engine having at least one exhaust port, and a primary exhaust pipe fluidly communicating with the at least one exhaust port. The primary exhaust pipe has an inlet, a main outlet downstream of the inlet, and at least one auxiliary outlet defined in a side of the primary exhaust pipe between the inlet and the main outlet. An auxiliary exhaust pipe extends from the at least one auxiliary outlet. An internal diameter of an outlet of the auxiliary exhaust pipe less than half of an internal diameter of the main outlet.

In an additional aspect, a muffler fluidly communicates with the at least one exhaust port of the engine. The muffler has a muffler body. The inlet of the primary exhaust pipe is disposed inside the muffler body. The outlet of the auxiliary exhaust pipe and the main outlet are disposed outside the muffler body.

In a further aspect, a frame supports the engine. The frame includes a tunnel. At least one ski is operatively connected to the frame. A drive track is driven by the engine and is disposed in part inside the tunnel. The outlet of the auxiliary exhaust pipe fluidly communicates with an inside of the tunnel.

For purposes of this application, terms related to spatial orientation such as forwardly, rearwardly, upwardly, downwardly, left, and right, are as they would normally be understood by a driver of the vehicle sitting thereon in a normal riding position.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 4 is a right side elevation view of a muffler of the snowmobile of FIG. 1;

FIG. 5 is a bottom plan view of the muffler of FIG. 4;

FIG. 6 is a front elevation view of the muffler of FIG. 4;

DETAILED DESCRIPTION

The present technology will be described with respect to a snowmobile. However it is contemplated that at least some aspects of the present technology could be provided on vehicles other than snowmobiles, such as, but not limited to, an all-terrain vehicle (ATV) or a side-by-side off-road vehicle (SSV).

Figure 1:
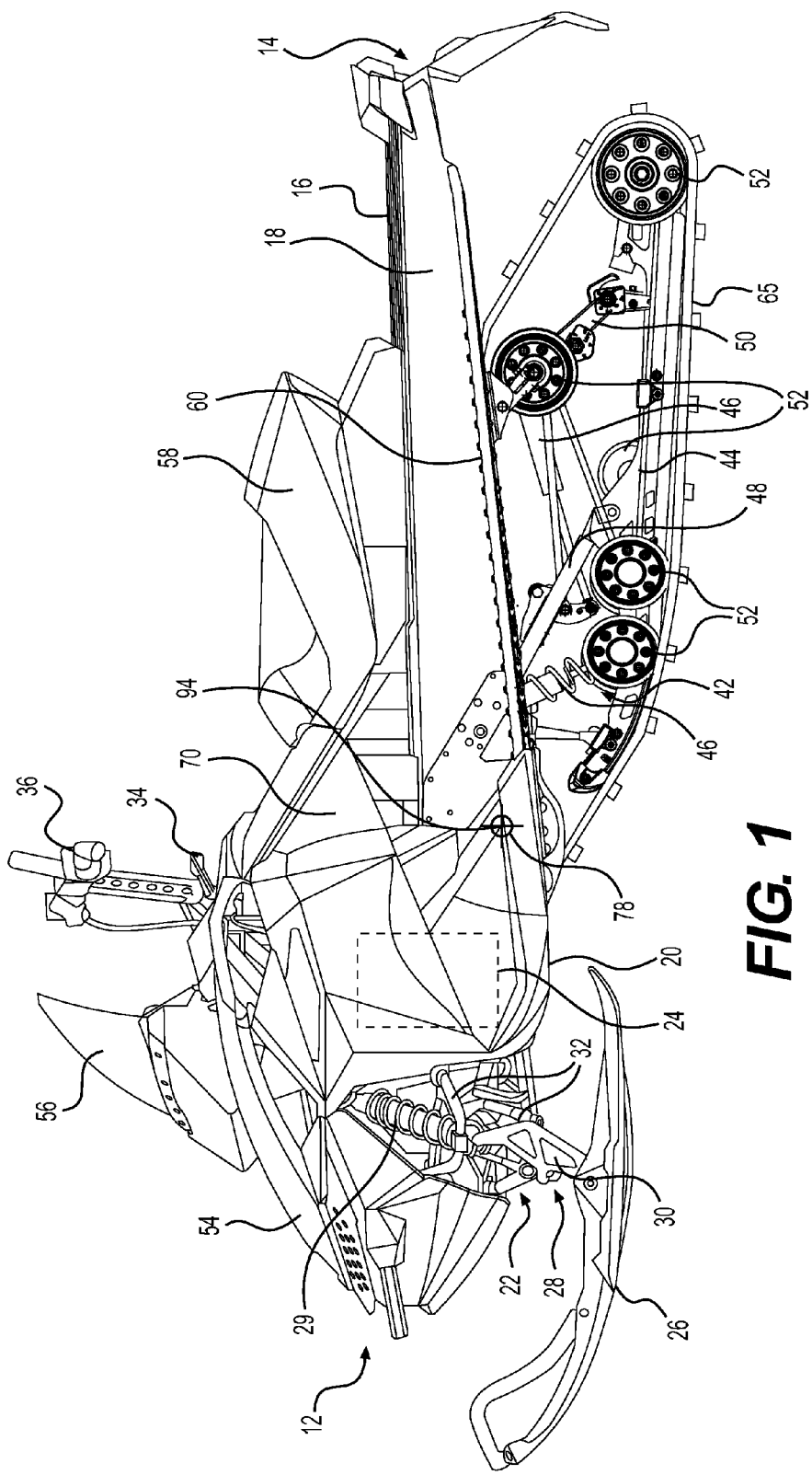
FIG. 1 is a left side elevation view of a snowmobile.

As can be seen in FIG. 1, a snowmobile 10 includes a forward end 12 and a rearward end 14 that are defined consistently with a travel direction of the snowmobile 10. The snowmobile 10 includes a frame 16 that includes a tunnel 18, a bottom plate 20 and a suspension module 21. The bottom plate 20 forms a portion of an engine cradle. A front suspension 22 is connected to the suspension module. The tunnel 18 generally consists of pieces of sheet metal bent to form an inverted U-shape. The tunnel 18 extends rearwardly along the longitudinal centerline of the snowmobile 10 and is connected at the front to the engine cradle. An engine 24, which is schematically illustrated in FIG. 1, is mounted to the engine cradle of the frame 16. Two skis 26 are positioned at the forward end 12 of the snowmobile 10 and are attached to the front suspension 22 through a pair of front suspension assemblies 28. Each front suspension assembly 28 includes a ski leg 30, a pair of A-arms 32 and a shock absorber 29 for operatively connecting the respective skis 26 to a steering column 34. Other types of front suspension assemblies 28 are contemplated, such as a swing-arm or a telescopic suspension. It is also contemplated that the snowmobile 10 could have only one ski 26. A steering device in the form of a handlebar 36, positioned forward of a rider, is attached to the upper end of the steering column 34 to allow the rider to rotate the ski legs 30 and thus the skis 26, in order to steer the snowmobile 10. U.S. Pat. No. 8,037,961, issued Oct. 18, 2011, the entirety of which is incorporated herein by reference, provides additional details regarding a steering assembly and front suspension assemblies suitable for the snowmobile 10.

An endless drive track 65 is positioned at the rear end 14 of the snowmobile 10. The endless drive track 65 is disposed generally under the tunnel 18, and is operatively connected to the engine 24 as will be described in greater detail below. The endless drive track 65 is driven to run about a rear suspension assembly 42 for propelling the snowmobile 10. The rear suspension assembly 42 includes a pair of slide rails 44 in sliding contact with the endless drive track 65. The rear suspension assembly 42 also includes two shock absorbers 46, which may further include a coil spring (not shown) surrounding the individual shock absorbers 46. Suspension arms 48 and 50 are provided to attach the slide rails 44 to the frame 16. Multiple idler wheels 52 are also provided in the rear suspension assembly 42.

At the front end 12 of the snowmobile 10, fairings 54 enclose the engine 24, thereby providing an external shell protecting the engine 24 and its associated components. The bottom plate 20 and the fairings 54 therefore define an engine compartment. The fairings 54 include a hood and side panels that can be opened to allow access to the engine 24 when this is required, for example, for inspection or maintenance of the engine 24. In the particular snowmobile 10 shown in FIG. 1, the side panels can be opened along a vertical axis to swing away from the snowmobile 10. A windshield 56 is connected to the fairings 54 near the front end 12 of the snowmobile 10 or alternatively directly to the handlebar 36. The windshield 56 acts as a windscreen to lessen the force of the air on the rider while the snowmobile 10 is moving.

A straddle-type seat 58 is positioned atop the frame 16 and more specifically on the fuel tank 70. The fuel tank 70 is connected to the top of the tunnel 18 at a front thereof. Two footrests 60 are positioned on opposite sides of the snowmobile 10 below the seat 58 to accommodate the driver's feet.

Figure 2:
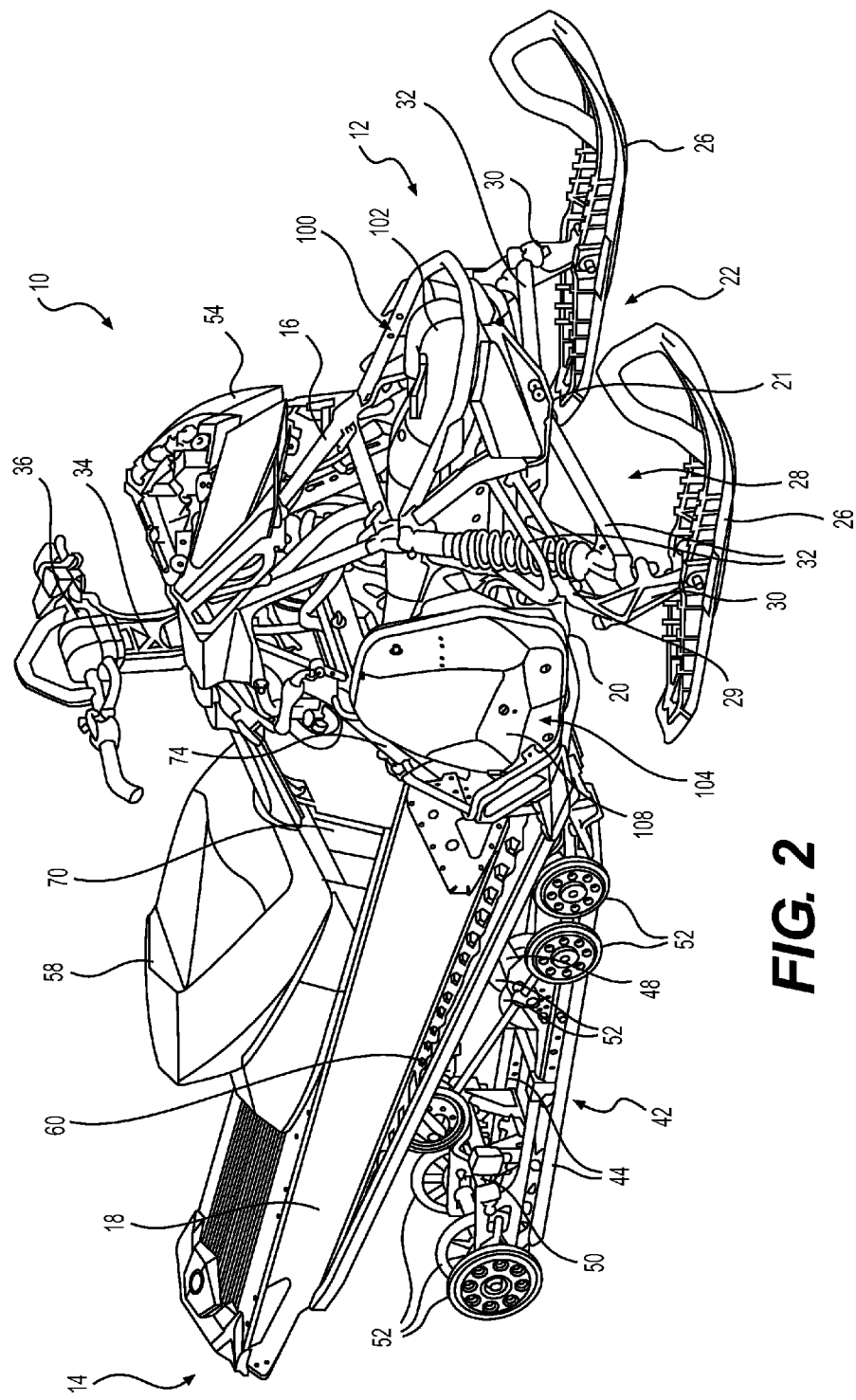
FIG. 2 is a perspective view taken from a front, right side of the snowmobile of FIG. 1 with the endless drive track and fairings removed.

A power pack for powering the endless drive track 65 will now be described. The power pack includes, but is not limited to, the engine 24, a variable ratio belt transmission system, also known as a continuously variable transmission or CVT (not shown), a reduction gearing 74 (FIG. 2), a countershaft (not shown) and a drive axle 78.

The engine 24 is a two-cylinder, two-cycle internal combustion engine. It is contemplated that the engine 24 could be of any other type, such as a four-cycle internal combustion engine. The engine 24 is disposed transversely in the engine cradle and rests on vibration dampers (not shown) to reduce the transmission of vibrations from the engine 24 to the frame 16. The vibration dampers are rubber mounts. The engine 24 comprises a crankshaft (not shown) that is integrally formed with an output shaft (not shown). The crankshaft and output shaft rotate about a horizontally disposed output shaft axis that extends generally transversely to the longitudinal centerline 61 of the snowmobile 10. It is contemplated that the crankshaft and output shaft could be separate shafts disposed coaxially such that the crankshaft drives the output shaft. It is also contemplated that the crankshaft and output shaft could be separate shafts that are offset from one another and could also rotate at different speeds relative to one another.

The CVT is disposed on a left side of the engine 24 and includes a driving pulley coupled to rotate with the output shaft of the engine 24 and a driven pulley coupled to the left end of the transversely mounted countershaft to rotate with the countershaft. A drive belt disposed around the pulleys transmits power from the driving pulley to the driven pulley. The driving pulley includes a pair of opposed frustoconical belt drive sheaves (one fixed sheave and one moving sheave) between which the drive belt is located. The sheaves are biased apart, and the driving pulley incorporates a centrifugally operated mechanism that acts to urge the moving sheave towards the fixed sheave with a force that increases with increasing output shaft speed so that as the engine speed increases, the reduction ratio of the CVT decreases. The driven pulley includes a pair of frustoconical belt drive sheaves between which the drive belt is located. The driven pulley reacts to the torque from the endless drive track 65 by separation of its sheaves which allows the drive belt to engage the driven pulley at a diameter that is progressively reduced as the torque increases or that is progressively increased as the torque decreases. When the driving pulley increases its diameter, the driven pulley decreases its effective diameter and vice versa, thus keeping the drive belt in tension. The drive belt is made of rubber, but it is contemplated that it could be made of metal.

The countershaft traverses the width of the engine cradle, is disposed rearward of the engine 24 and defines a countershaft axis. The reduction gearing 74 is disposed on a right side of the engine 24. The right end of the countershaft is connected to an input member of the reduction gearing 74. The input member of the reduction gearing 74 consists of a small sprocket (not shown) connected to the countershaft. An output member of the reduction gearing is connected to the drive axle 78. The output member consists of a sprocket (not shown) that is larger than the sprocket of the input member and is connected to the drive axle 78. The output member is driven via a chain (not shown) by the input member. It is also contemplated that the output member could be driven via gears by the input member. The input member, the output member, and the chain are enclosed within the housing of the reduction gearing 74. The drive axle 78 is disposed in the tunnel 18 and carries sprocket wheels (not shown) that form a driving connection with the endless drive track 65. The drive axle 78 defines a drive axle axis 94.

It is contemplated that the reduction gear 74 could be disposed on the left side of the engine 24 and that the CVT could be disposed on the right side of the engine 24.

The driving pulley rotates at the same speed as the output shaft. The speed of rotation of the countershaft is determined in accordance with the instantaneous ratio of the CVT. The drive axle 78 rotates at a lower speed than the countershaft since the reduction gearing 74 has a reduction ratio.

The engine 24 has two air intake ports (one per cylinder) on a rear side thereof that fluidly communicate with the cylinders of the engine 24. An air intake system (not shown) is connected to the air intake ports to supply air to the engine 24. The air intake system includes an air intake manifold (not shown), an air intake controller (not shown) and an air box (not shown). The air intake manifold is connected to the rear side of the engine 24 so as to fluidly communicate with the air intake ports. The air intake controller is connected to the top of the air intake manifold. It is contemplated that two intake controllers could be used. The air intake controller includes a valve that controls the flow of air to the engine 24. It is contemplated that the air intake controller could be in the form of a carburetor or a throttle body. The air box is connected to the top of the air intake controller. The air box defines the inlet of the air intake system. The inlet of the air intake system 96 faces toward a left of the snowmobile 10. The air box has an air filter disposed inside of it.

The engine 24 has two exhaust ports (one per cylinder) disposed on a front side of the engine 24 that fluidly communicate with the cylinders of the engine 24. An exhaust system 100 fluidly communicates with the engine 24 to exhaust the gases from the combustion process. The exhaust system 100 will now be described in more detail with reference to FIGS. 2 and 3. The exhaust system 100 has an exhaust manifold (not shown) connected to the front of the engine 24 to fluidly communicate with the two exhaust ports. An outlet of the exhaust manifold is connected to an inlet of a tuned pipe 102. The tuned pipe 102 has a diverging portion connected to a generally U-shaped diverging portion that is connected to a converging portion defining an outlet of the tuned pipe 102.

Figure 3:
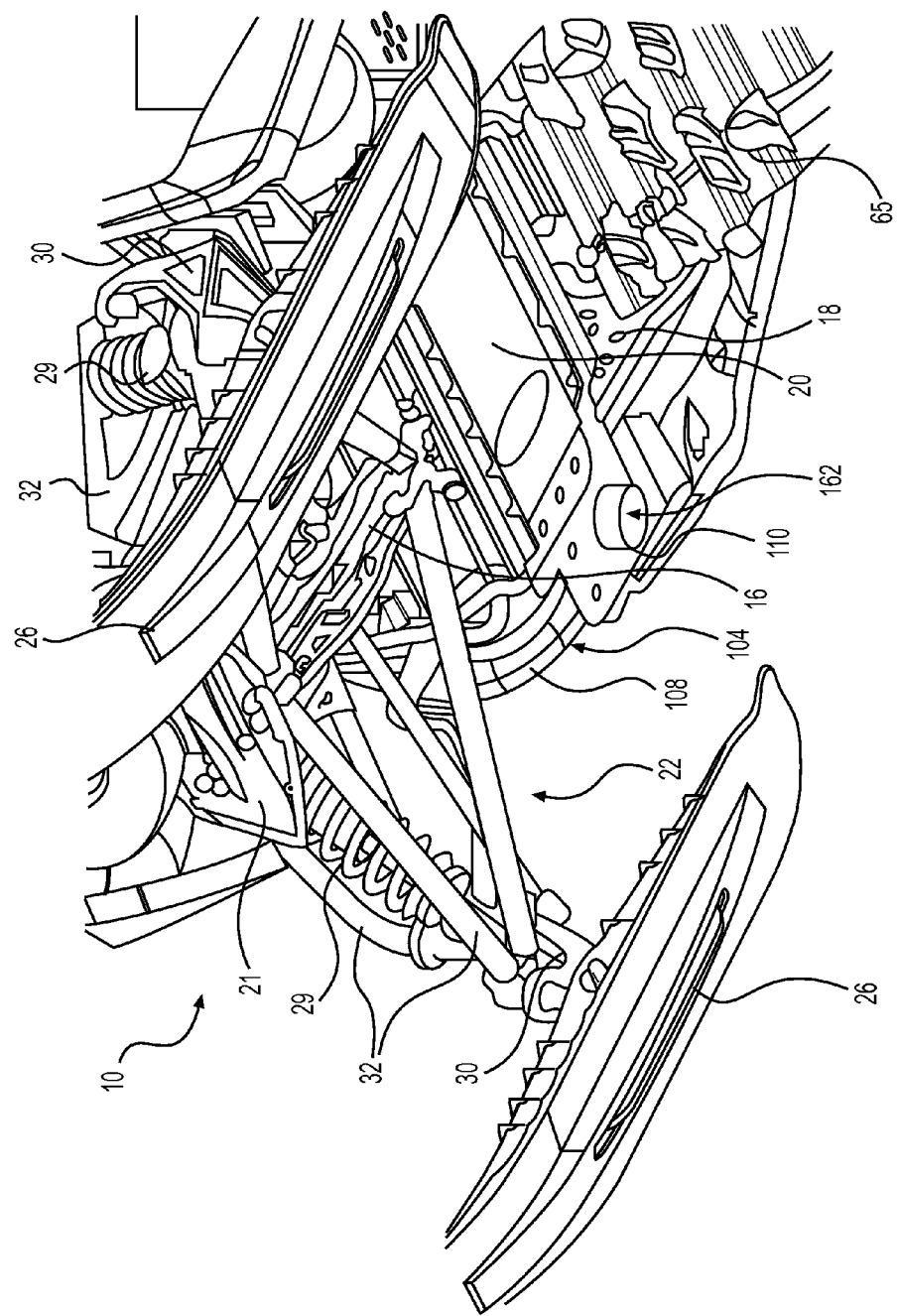
FIG. 3 is a perspective view taken from a front, left side of a bottom of a front portion of the snowmobile of FIG. 1 with the fairings removed.
Figure 7:
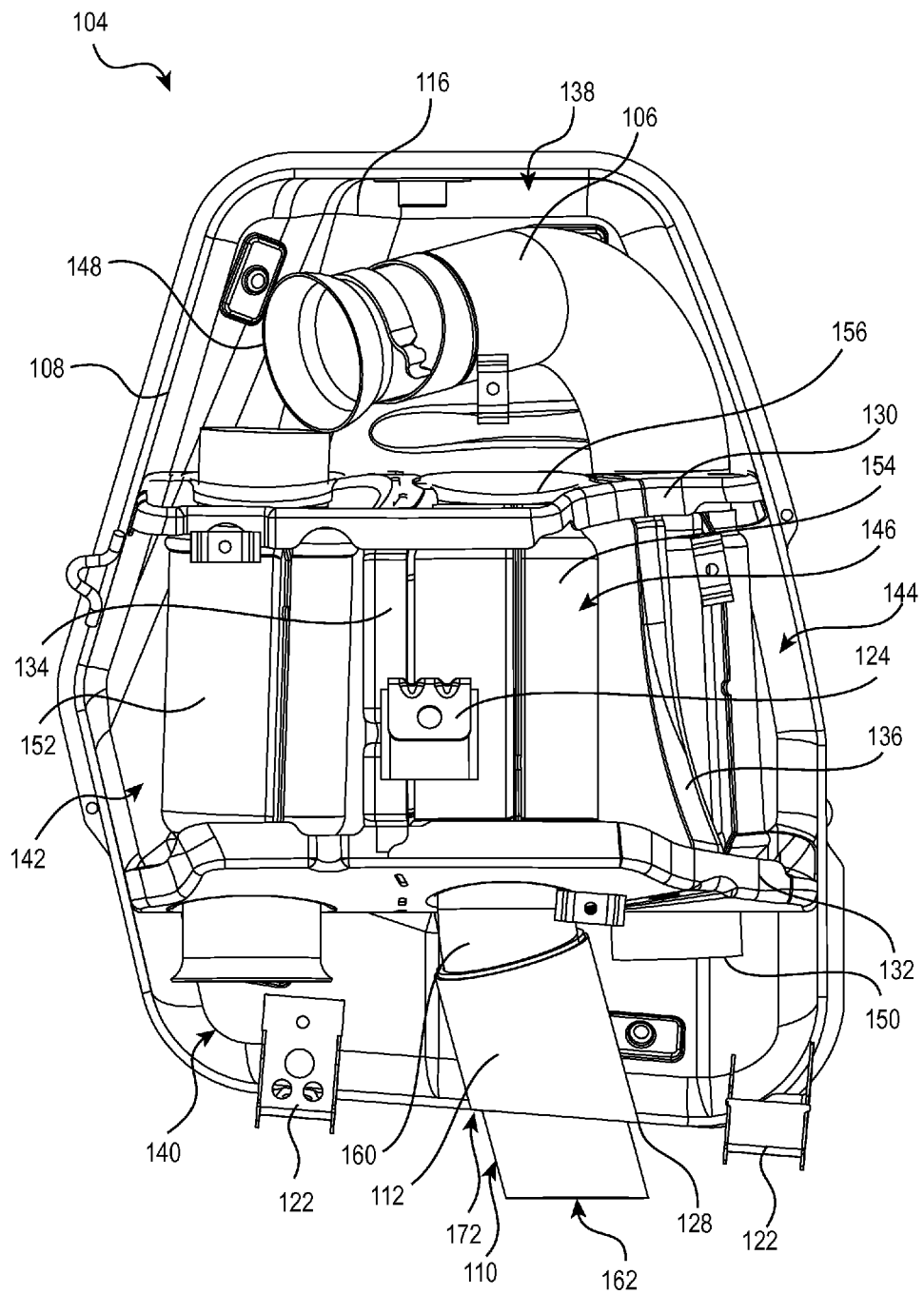
FIG. 7 is a left side elevation view of the muffler of FIG. 4 with a left cover of a muffler body removed.

The outlet of the tuned pipe 102 is connected to a muffler 104 disposed on a right side of the frame 16. More specifically, the outlet of the tuned pipe 102 is connected to an inlet pipe 106 of the muffler 104. It is contemplated that the muffler 104 could be disposed on the right side of the frame 16 or at any other suitable location on the snowmobile 10. Exhaust gases from the engine 24 flow through the exhaust manifold, into the tuned pipe 102, then into the muffler 104 via the inlet pipe 106, through a muffler body 108 of the muffler 104 as will be described below. From the muffler body 108, exhaust gases then flow to the atmosphere via a primary exhaust pipe 110 of the muffler 104 or to the engine compartment via an auxiliary exhaust pipe 112 depending on the operating conditions as will be described below. As can be seen in FIG. 3, the primary exhaust pipe 110 extends through the bottom plate 20.

Turning now to FIGS. 4 to 12, the muffler 104 will be described in more detail. As described above, the muffler 104 has an inlet pipe 106, a muffler body 108, a primary exhaust pipe 110 and an auxiliary exhaust pipe 112.

The muffler body 108 is made of a right cover 116 and a left cover 118 that are fastened to each other. The right cover 116 has five brackets 120 on the outside thereof. The brackets 120 are used to attach a protective cover (not shown) to the muffler 104. The left cover 118 has two lower brackets 122 and a central bracket 124 used to fasten the muffler 104 to the frame 16 of the snowmobile 10. The left cover 118 defines an aperture 126 near a top thereof in a generally forwardly facing wall thereof. The inlet pipe 106 is received in the aperture 126. The bottom walls of the left and right covers 116, 118 each define a portion on an aperture 128 in which the primary exhaust pipe 110 and the auxiliary exhaust pipe 112 are received.

As best seen in FIGS. 7 to 10, an interior of the muffler body 108 is separated into different chambers by upper and lower generally horizontally extending plates 130, 132 and by front and rear generally vertically extending plates 134, 136. The front and rear plates 134, 136 are connected between the upper and lower plates 130, 132. A top chamber 138 is defined above the upper plate 130. A bottom chamber 140 is defined below the lower plate 132. A front chamber 142 is defined in front of the front plate 134. A rear chamber 144 is defined behind the rear plate 136. A central chamber 146 is defined between the upper, lower, front and rear plates 130, 132, 134, 136.

Figure 8:
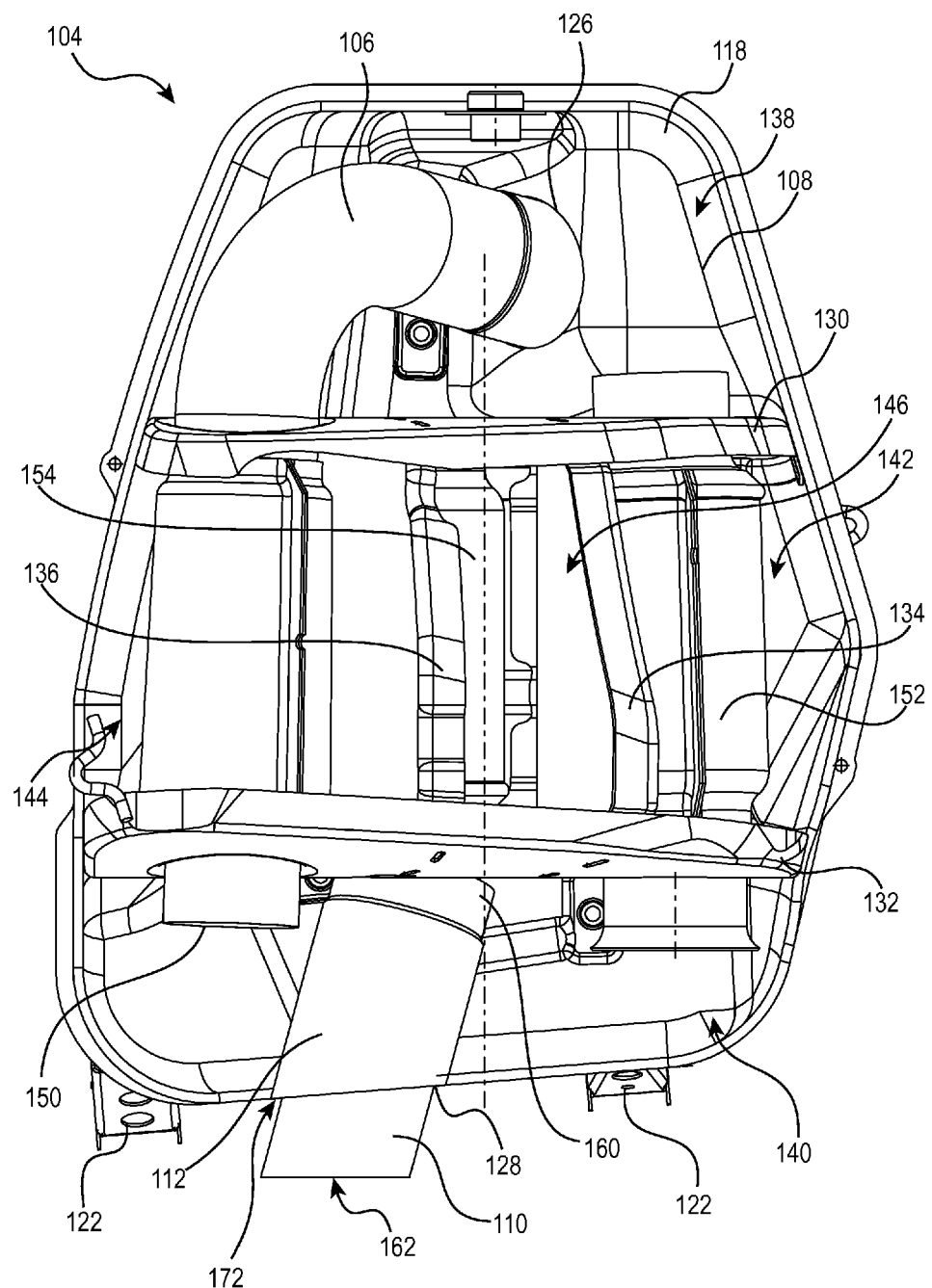
FIG. 8 is a right side elevation view of the muffler of FIG. 4 with a right cover of the muffler body removed.
Figure 9:
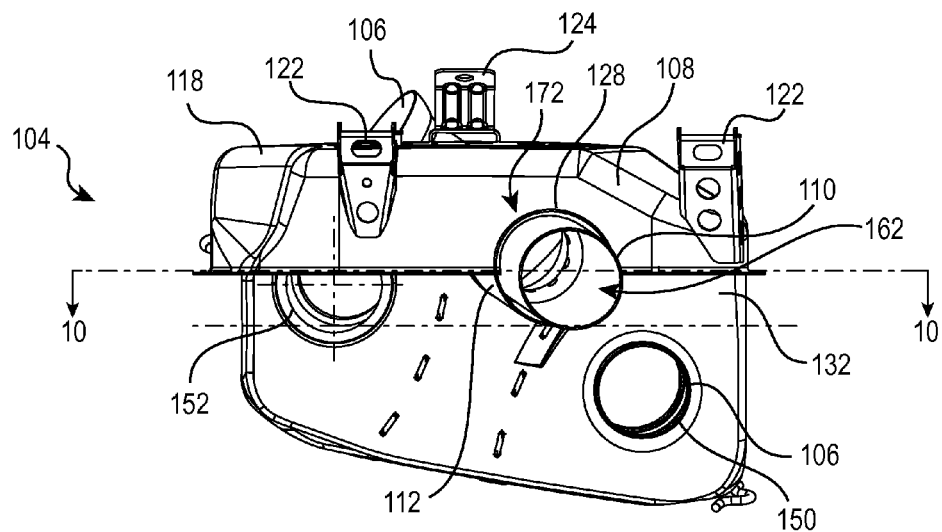
FIG. 9 is a bottom plan view of the muffler of FIG. 4 with the right cover of the muffler body removed.

As can be seen in FIG. 6, the inlet pipe 106 has an inlet 148 disposed outside of the muffler body 108. From its inlet 148, the inlet pipe 106 extends rearward through the aperture 126 in the left cover 118 of the muffler body and into the top chamber 138. As can be seen in FIG. 8, the inlet pipe 106 then bends and extends downwardly through the upper plate 130, the rear chamber 144 and the lower plate 132. As a result, an outlet 150 of the inlet pipe 106 is disposed in the lower chamber 140 near a rear thereof. A pipe 152 extends from the lower chamber 140, through the lower plate 132, the front chamber 142 and the upper plate 130 to the top chamber 138. Accordingly, the pipe 152 fluidly communicates the lower chamber 140 with the upper chamber 138. A majority of a pipe 154 is disposed in the central chamber 146. The pipe 154 is connected to a flange 156 defining an aperture in the upper plate 130. The pipe 154 extends through the lower plate 132 and connects to an inlet 158 (FIG. 10) of the primary exhaust pipe 110 disposed in the lower chamber 140 via a sleeve 160. As a result, the pipe 154 fluidly communicates the upper chamber 138 with the primary exhaust pipe 110. As can be seen each of the pipes 106, 152, 154 is made of multiple sections. It is contemplated that each one of the pipes 106, 152, 154 could be made of a single section or more or less sections than illustrated. The portions of the pipes 106, 152, 154 disposed between the upper plate 130 and the lower plate 132 are perforated to fluidly communicate the pipes 106, 152, 154 with their respective chambers 144, 142, 146. The volume of the chambers 142, 144, 146 around their respective pipes 152, 106, 154 is completely or partially filled with sound absorbing material such as sound absorbing foam. It is contemplated that the sound absorbing foam could be omitted from one or more of the chambers 142, 144, 146.

From the tuned pipe 102, exhaust gases flow through the inlet pipe 106 into the lower chamber 140. From the lower chamber 140, exhaust gases flow through the pipe 152 into the upper chamber 138. From the upper chamber 138, exhaust gases flow through the pipe 154 into the primary exhaust pipe 110.

It is contemplate that one or more of the plates 130, 132, 134, 136 and the pipes 150, 152 could be omitted and that they could be arranged differently than illustrated. It is contemplated that more plates and pipes could be provided. For example, in one alternative embodiment, all of the plates 130, 132, 134, 136 and the pipes 150, 152 are omitted. In such an embodiment, exhaust gases flow out of the outlet 150 of the inlet pipe 106 into the volume defined by the muffler body 108 and from there flow directly into the primary exhaust pipe 110. It is also contemplated that the muffler body 108 could be shaped differently than illustrated. For example, it is contemplated that the muffler body 108 could be generally cylindrical with a first closed end through which the inlet pipe 106 enter the muffler body 108 and a second closed end through which the primary exhaust pipe 110 extends out of the muffler body 108.

Figure 12:
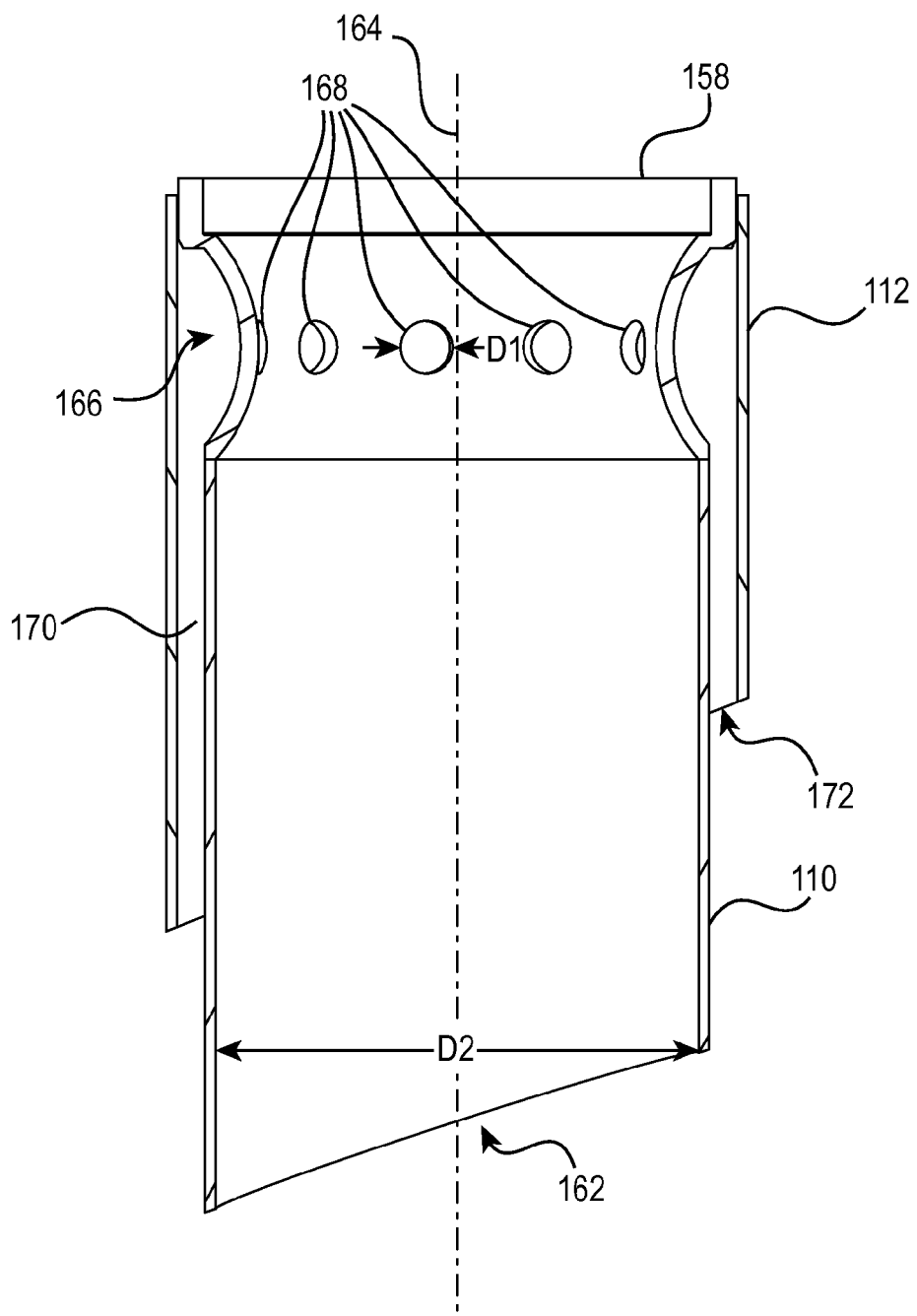
FIG. 12 is a cross-sectional view of a primary exhaust pipe and auxiliary exhaust pipe assembly of FIG. 4 taken through a center of the assembly.
Figure 13:
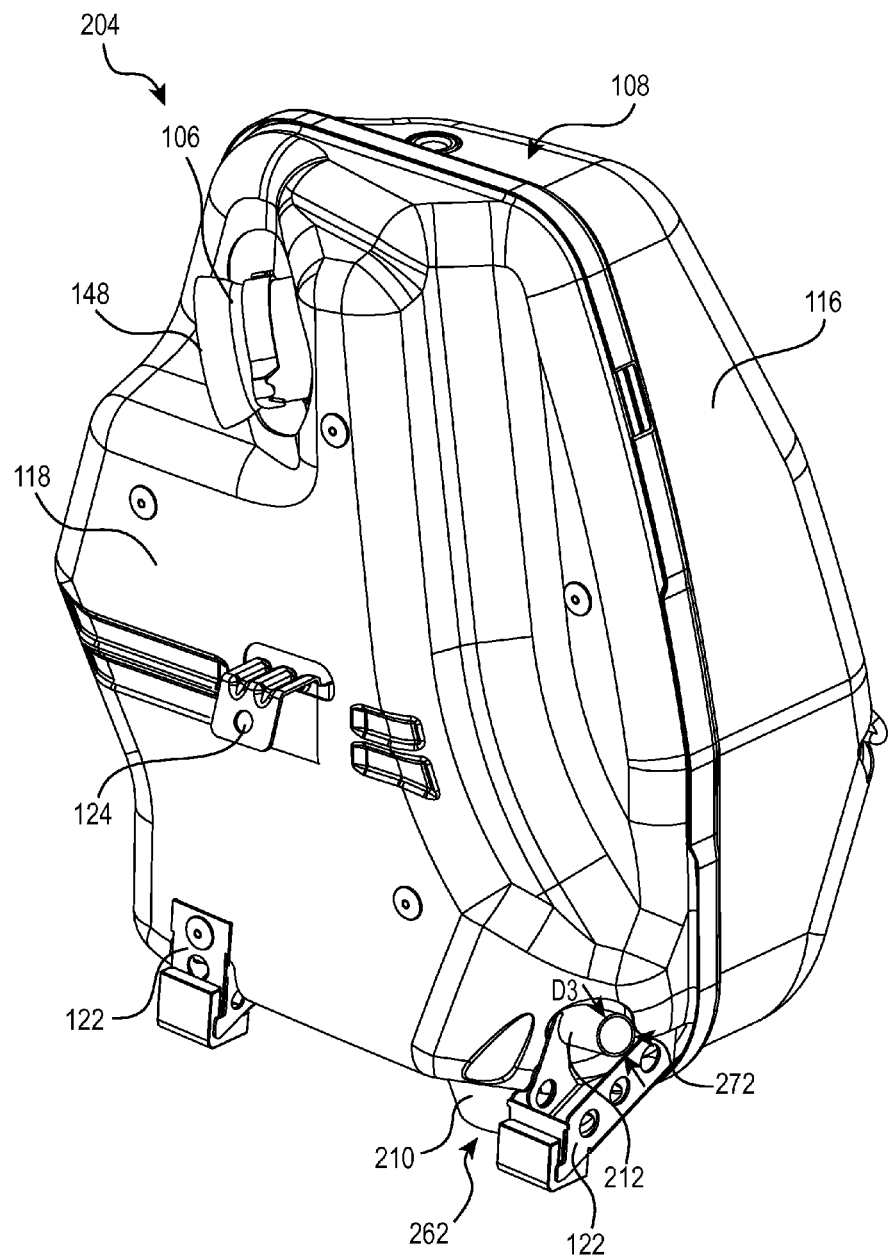
FIG. 13 is a perspective view taken from a rear left side of an alternative embodiment of a muffler of the snowmobile of FIG. 1.
Figure 14:
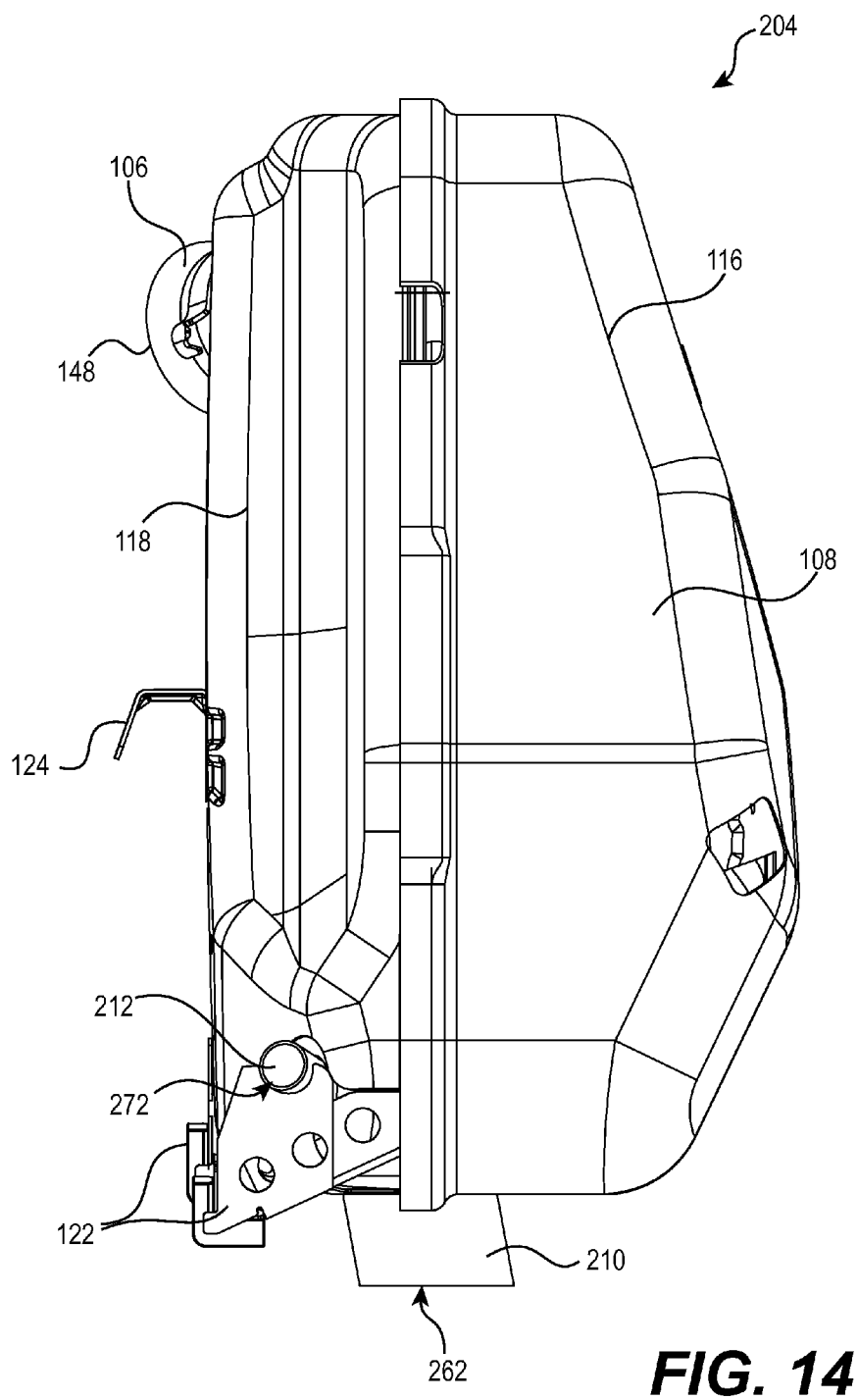
FIG. 14 is a rear elevation view of the muffler of FIG. 13.
Figure 15:
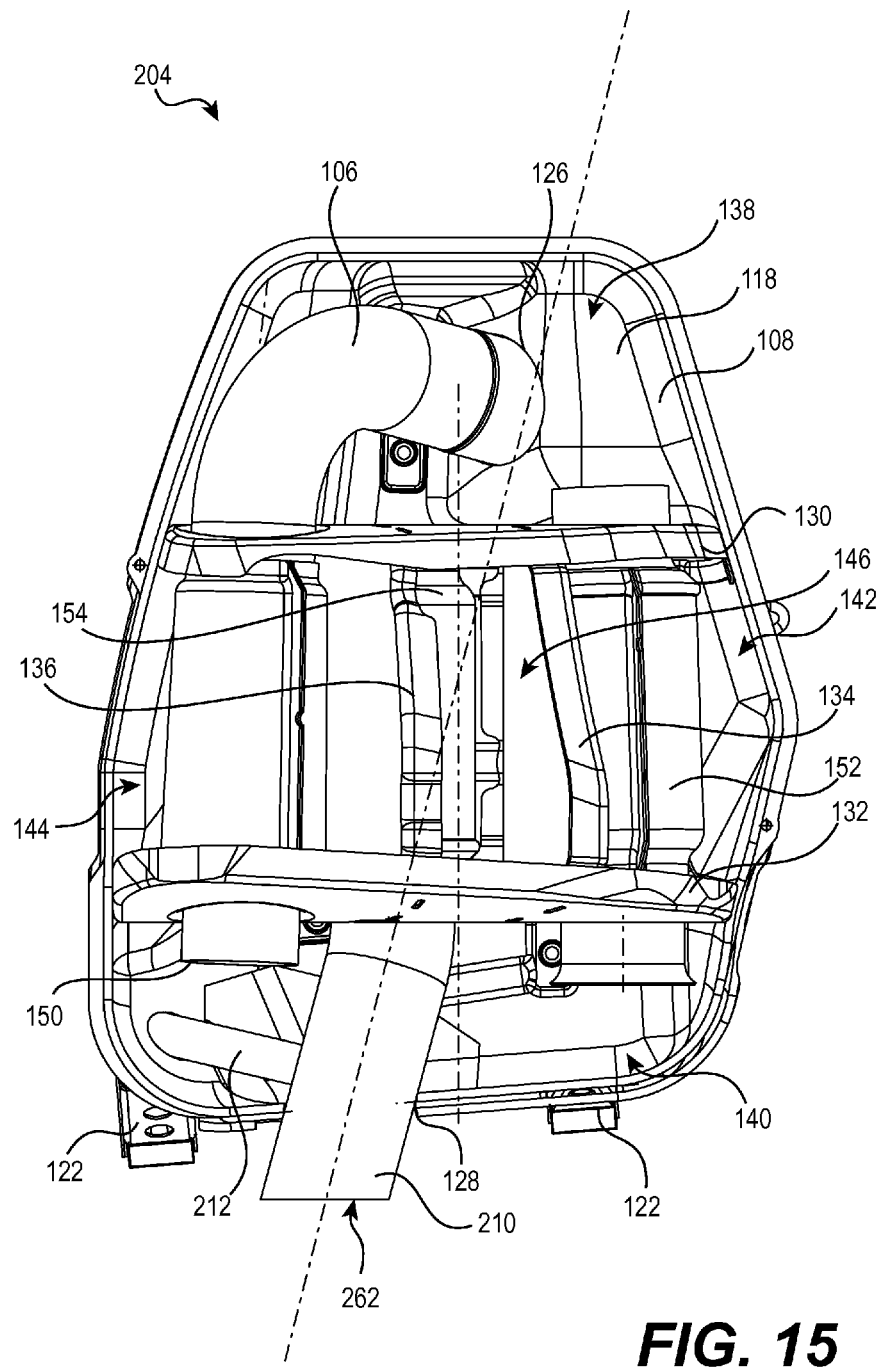
FIG. 15 is a right side elevation view of the muffler of FIG. 13 with a right cover of the muffler body removed.

As best seen in FIG. 12, the primary exhaust pipe 110 has an inlet 158 as discussed above and a main outlet 162 opposite the inlet 158. The end of the primary exhaust pipe 110 defining the main outlet 162 is angled such that this end of the primary exhaust pipe 110 is generally horizontal when the primary exhaust pipe 110 is mounted to the muffler 104. It is contemplated that the end of the primary exhaust pipe 110 defining the main outlet 162 could be at any angle. For example, it is contemplated that the end of the primary exhaust pipe 110 defining the main outlet 162 could be perpendicular to a centerline 164 of the primary exhaust pipe 110. As can be seen the portion of the primary exhaust pipe 110 near the inlet 158 defines a venturi 166. Nine auxiliary outlets 168 are defined in the side of the venturi 166 (only four and a half auxiliary outlets 168 being shown in the cross-section of FIG. 12) in the portion of the venturi 166 having the smallest diameter. The auxiliary outlets 168 are equally spaced from each other and have the same diameter. It is contemplated that there could be more or less than nine auxiliary outlets 168, that the auxiliary outlets could have different diameters, and that the auxiliary outlets 168 could not be equally spaced. It is also contemplated that the auxiliary outlets 168 could be offset from the portion of the venturi 166 having the smallest diameter while still being defined in a portion of the venturi 166. It is also contemplated that the venturi 166 could be omitted and that the auxiliary outlets 168 could be defined in the side of the primary exhaust pipe 110. As can be seen, a diameter D1 of each of the auxiliary outlets 168 (only shown for one auxiliary outlet 168 for clarity) is smaller than a diameter D2 of the main outlet 162 (measured perpendicularly to the centerline 164). In the present embodiment, the total surface area of the nine auxiliary outlets 168 is less than one tenth the surface area of the main outlet 162 measured perpendicularly to the centerline 164 (i.e. the surface area at the position of D2 in FIG. 12). It is contemplated that the total surface area of the auxiliary outlets 168 could be greater than or equal to one tenth of the surface area of the main outlet 162 while still being less than the surface area of the main outlet 162. For example, it is contemplated that the total surface area of the nine auxiliary outlets 168 could be about a quarter of the surface area of the main outlet 162.

The auxiliary exhaust pipe 112 is disposed around the primary exhaust pipe 110. The auxiliary exhaust pipe 112 is connected to and in contact with the end of the primary exhaust pipe 110 defining the inlet 158 and extends over the auxiliary outlets 168. The auxiliary exhaust pipe 112 is coaxial with the primary exhaust pipe 110 such that an annular fluid passage 170 is defined between the auxiliary exhaust pipe 112 and the primary exhaust pipe 110. It is contemplated that the auxiliary exhaust pipe 112 and the primary exhaust pipe 110 could not be concentric. It is also contemplated that the auxiliary exhaust pipe 112 could not be disposed around the primary exhaust pipe 110. For example, it is contemplated that the auxiliary exhaust pipe 112 could be a plurality of auxiliary exhaust pipes 112 each connected to and extending from a corresponding auxiliary outlet 168 of the primary exhaust pipe 110. The auxiliary exhaust pipe 112 has an outlet 172. The end of the auxiliary exhaust pipe 112 defining the outlet 172 is angled such that this end of the auxiliary exhaust pipe 112 generally follows the contour of the aperture 128 defined in the bottom wall of the muffler body 108. It is contemplated that the end of the auxiliary exhaust pipe 112 defining the outlet 172 could be at any angle. For example, it is contemplated that the end of the auxiliary exhaust pipe 112 defining the outlet 172 could be perpendicular to the centerline 164 of the auxiliary exhaust pipe 112 (corresponding to the centerline 164 of the primary exhaust pipe 110). As can be seen, the primary exhaust pipe 110 is longer than the auxiliary exhaust pipe 112. As such, the primary exhaust pipe 110 extends from the auxiliary exhaust pipe 112 and the main outlet 162 of the primary exhaust pipe 110 is spaced from the outlet 172 of the auxiliary exhaust pipe 112.

Figure 10:
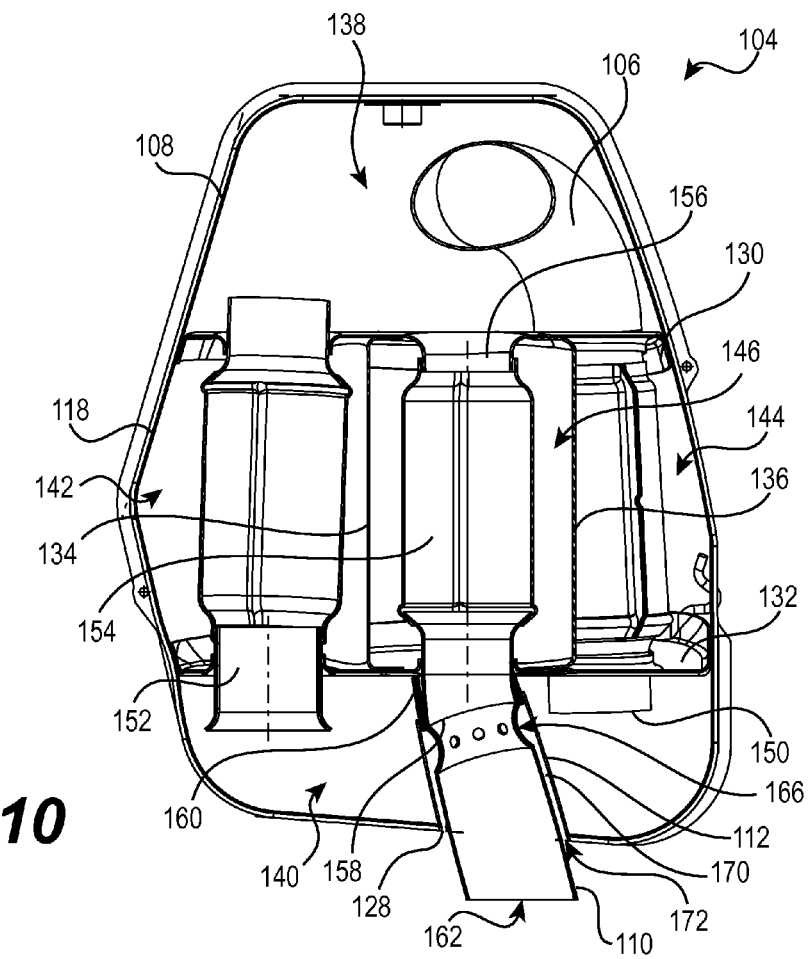
FIG. 10 is a cross-sectional view of the muffler of FIG. 4 taken through line 10-10 of FIG. 9.
Figure 11:
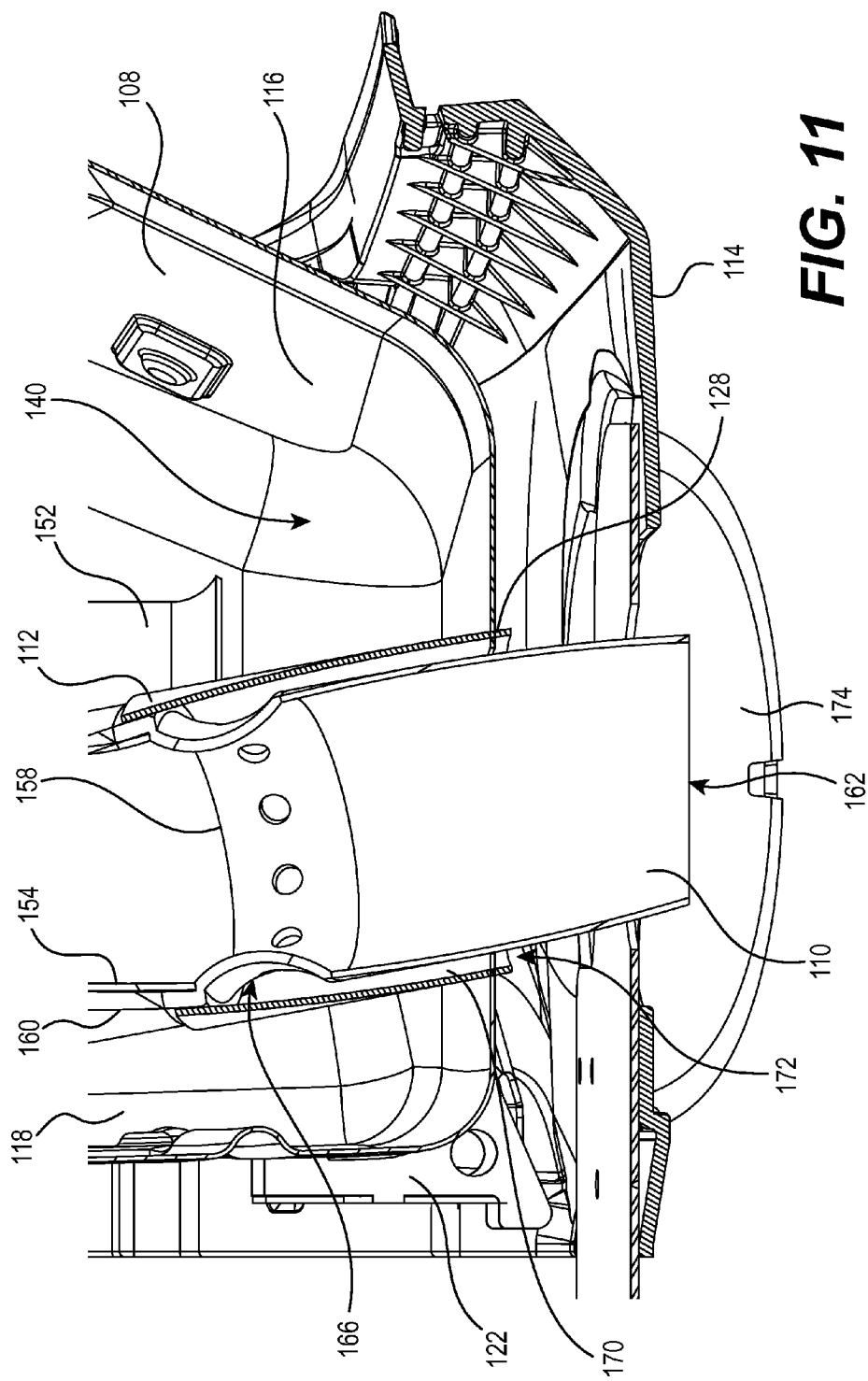
FIG. 11 is a lateral cross-sectional view of a bottom portion of the muffler of FIG. 4 and a bottom of the neighbouring portion of an engine compartment of the snowmobile of FIG. 1.

As can be seen in FIGS. 10 and 11, the main inlet 158 and the auxiliary outlets 168 of the primary exhaust pipe 110 are disposed in the lower chamber 140 of the muffler body 108 and the main outlet 162 of the primary exhaust pipe 110 is disposed outside the muffler body 108. The primary exhaust pipe 110 extends downward and rearward from the pipe 154. More specifically, as best seen in FIG. 11, the primary exhaust pipe 110 extends from the muffler body 108, through the bottom plate 20 and through a lower fairing 114 outside the engine compartment so as to fluidly communicate the muffler body 108 with the atmosphere. As can also be seen in FIGS. 10 and 11, the auxiliary exhaust pipe 112 is disposed inside the lower chamber 140 of the muffler body 108. The auxiliary exhaust pipe 112 fluidly communicates the auxiliary outlets 168 with the engine compartment. It is contemplated that the outlet 172 of the auxiliary exhaust pipe 112 could be disposed outside of the engine compartment. It is contemplated that the venturi 166 could be disposed outside of the muffler body 108, in which case the auxiliary exhaust pipe 112 would also be disposed, at least in part, outside of the muffler body 108 so as to cover the auxiliary outlets 168.

As can also be seen in FIG. 11, a deflector 174 is connected to a bottom of the lower fairing 114 at a position forward of the main exhaust outlet 162 of the exhaust pipe 110. The deflector 174 deflects snow away from the main exhaust outlet 162 when the snowmobile 10 moves forward.

When the engine 24 is in operation and the main exhaust outlet 162 of the primary exhaust pipe 110 is not blocked, exhaust gases flow from the pipe 154 into the primary exhaust pipe 110 via the inlet 158 of the primary exhaust pipe 110. As the exhaust gases pass through the venturi 166, the pressure of the exhaust gases in the region of the auxiliary outlets 168 becomes less than the pressure inside the engine compartment. As a result, air in the engine compartment flows from the engine compartment into the fluid passage 170 via the outlet 172 of the auxiliary exhaust pipe 112 and into the primary exhaust pipe 110 via the auxiliary outlets 168. This air in entrained with the exhaust gases. From the venturi 166, the exhaust gases (and the air) flow through the primary exhaust pipe 110 and out to the atmosphere via the main outlet 162 of the primary exhaust pipe 110. It is contemplated that, as the exhaust gases pass through the venturi 166, the pressure of the exhaust gases in the region of the auxiliary outlets 168 could be higher than the pressure inside the engine compartment, in which case some exhaust gases would flow out of the auxiliary outlets 168 into the auxiliary exhaust pipe 112 and flow through the passage 170 and the outlet 172 of the auxiliary exhaust pipe 112 into the engine compartment and a majority of the exhaust gases would continue to flow down the primary exhaust pipe 110 and flow out to the atmosphere via the main outlet 162 of the primary exhaust pipe 110.

When the engine 24 is in operation and the main exhaust outlet 162 of the primary exhaust pipe 110 is blocked, by snow for example, exhaust gases flow from the pipe 154 into the primary exhaust pipe 110 via the inlet 158 of the primary exhaust pipe 110. As the main outlet 162 is blocked, the pressure inside the venturi 166 becomes higher than the pressure in the engine compartment. As a result, the exhaust gases flow out of the auxiliary outlets 168 into the auxiliary exhaust pipe 112 and flow through the passage 170 and the outlet 172 of the auxiliary exhaust pipe 112 into the engine compartment. If the main outlet 162 of the primary exhaust pipe 110 is blocked by snow or ice, the heat of the exhaust gases eventually melt the ice or snow, which causes the main outlet 162 to become free of obstruction and exhaust gases resume flowing as described above when the main outlet 162 is not blocked. Should the main outlet 162 be only partially blocked, some exhaust gases flow out of the outlet 172 of the auxiliary exhaust pipe 112 into the engine compartment as described above and some exhaust gases flow out of the unobstructed portion of the main outlet 162 of the primary exhaust pipe 110 into the atmosphere.

Turning now to FIGS. 13 to 17, a muffler 204 will be described. The muffler 204 is an alternative embodiment of the muffler 104 described above. The muffler 204 is similar to the muffler 104 except that the primary exhaust pipe 110 and the auxiliary exhaust pipe 112 have been replaced by a primary exhaust pipe 210 and an auxiliary exhaust pipe 212. Features of the muffler 204 that are similar to features of the muffler 104 have been labeled in the figures with the same reference numerals and will not be described again in detail below.

Figure 16:
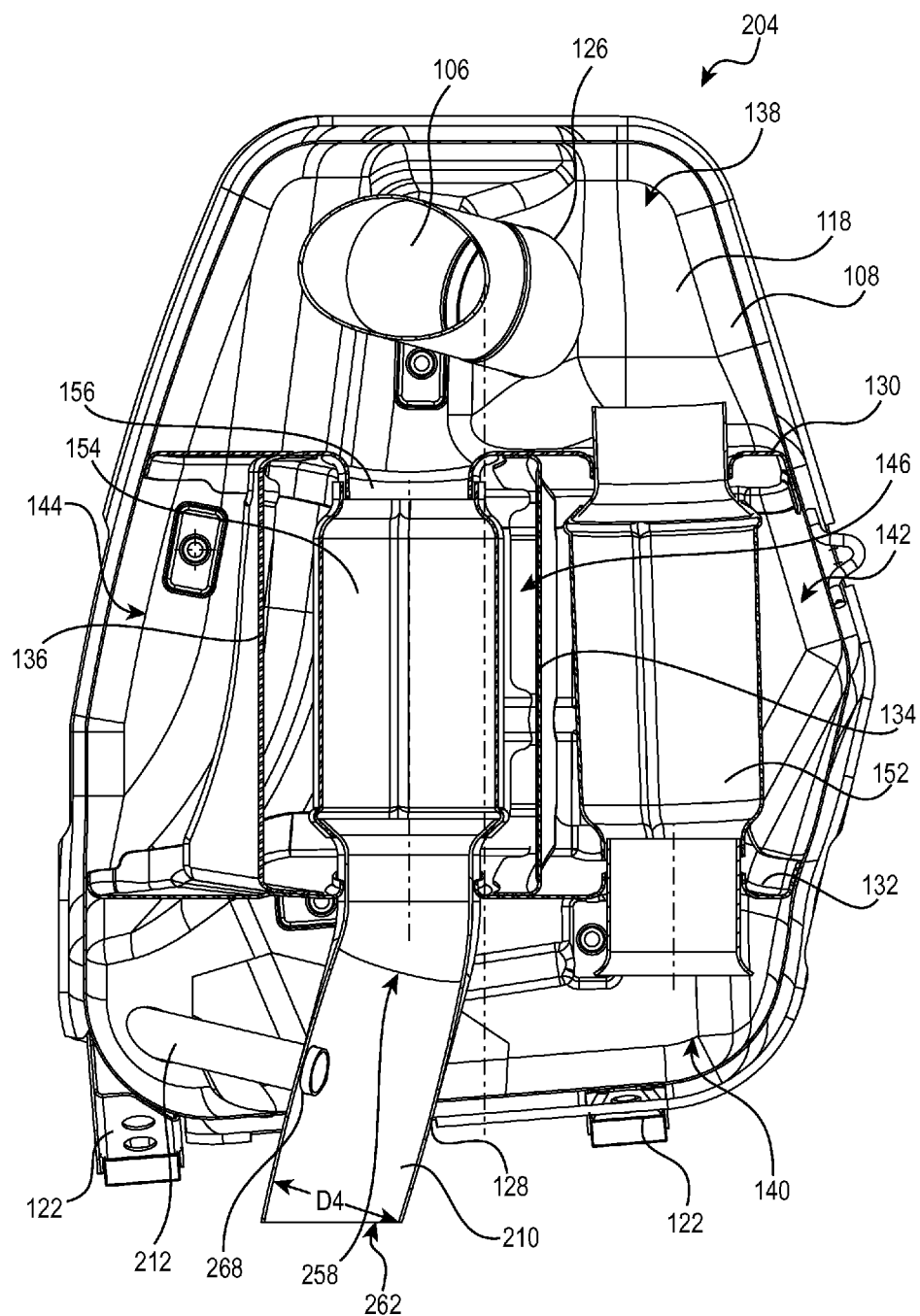
FIG. 16 is a cross-sectional view of the muffler of FIG. 13 taken along a length thereof.

The primary exhaust pipe 210 has an inlet 258 disposed in the lower chamber 140 of the muffler body 108 and a main outlet 262 disposed outside the muffler body 108 and outside the engine compartment. Like the primary exhaust pipe 110 described above, the primary exhaust pipe 210 extends through the bottom plate 20 and the lower fairing 114. In the present embodiment, the primary exhaust pipe 210 is integrally formed with the lower section of the pipe 154; however it is contemplated that the primary exhaust pipe 210 could be a separate pipe connected to the pipe 154. An auxiliary outlet 268 is defined in a side of the primary exhaust pipe 210 between the inlet 258 and the outlet 262. As can be seen in FIG. 16, the auxiliary outlet 268 is disposed in the lower chamber 140 of the muffler body 108.

The auxiliary exhaust pipe 212 extends through the auxiliary outlet 268 and extends partly inside the primary exhaust pipe 210. It is contemplated that the auxiliary exhaust pipe 212 could not extend inside the primary exhaust pipe 210. It is also contemplated that the auxiliary exhaust pipe 212 could not extend through the auxiliary outlet 268, but instead be connected to an outer surface of the primary exhaust pipe 210 around the auxiliary outlet 268. From the primary exhaust pipe 210 the auxiliary exhaust pipe 212 extends rearward inside the lower chamber 140 of the muffler body 108 and through a rear wall of the left cover 118 of the muffler body 108. It is contemplated that the auxiliary exhaust pipe 212 could extend through any other wall of the muffler body 108. It is contemplated that the auxiliary outlet 268 and the auxiliary exhaust pipe 212 could both be disposed outside the muffler body 108. In the present embodiment, an internal diameter D3 (FIG. 13) of an outlet 272 of the auxiliary exhaust pipe 212 is less than a third of an internal diameter D4 (FIG. 16) of the main outlet 262 of the primary exhaust pipe 210. It is contemplated that the internal diameter D3 could be less than half the internal diameter D4. The internal diameters D3 and D4 are measured perpendicularly to the centerline of their respective pipe 212 or 210. It is contemplated that the primary exhaust pipe 210 could be provided with multiple auxiliary outlets 268 fluidly communicating with the auxiliary exhaust pipe 212 or with multiple auxiliary exhaust pipes 212.

Figure 17:
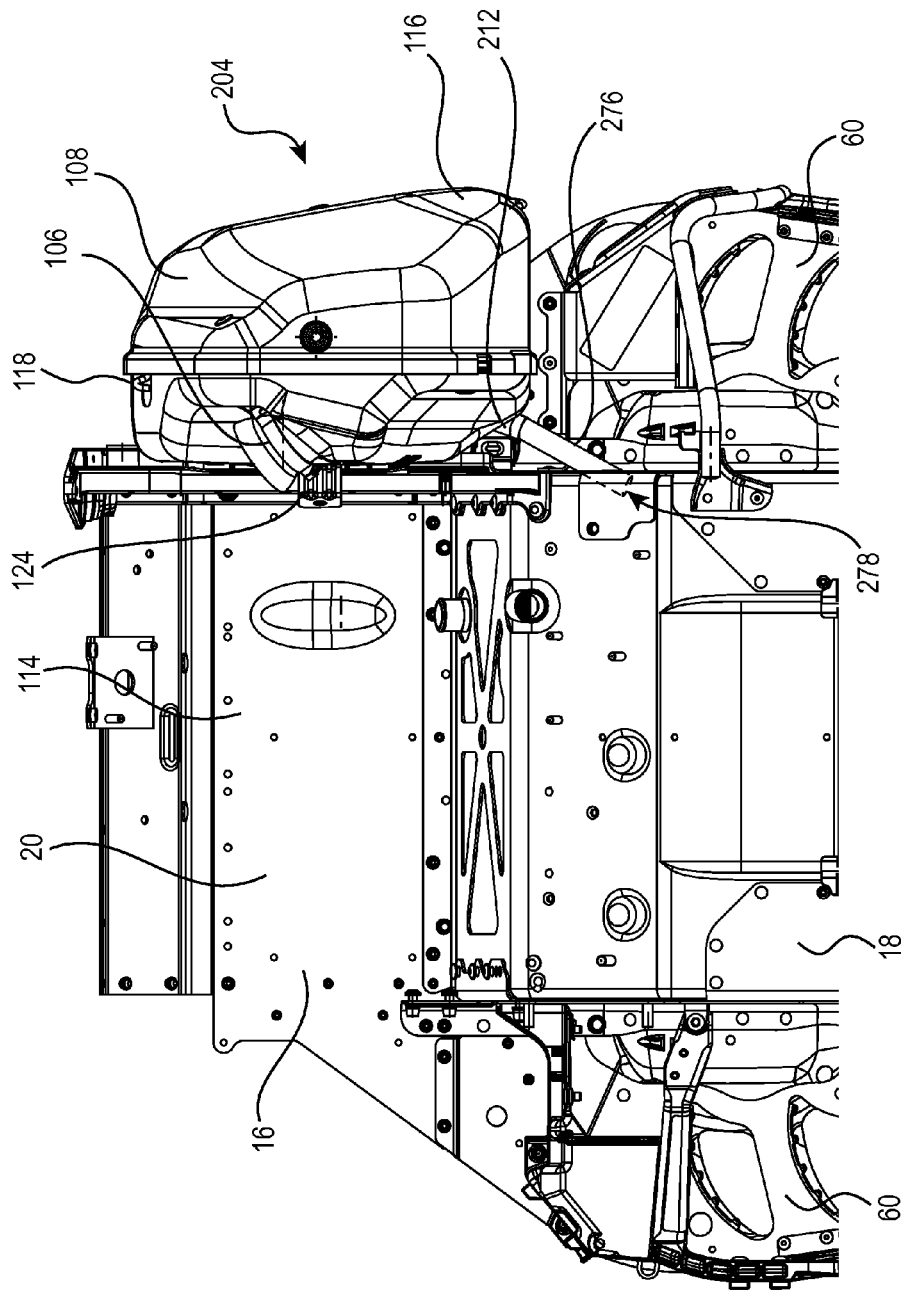
FIG. 17 is a top plan view of the muffler of FIG. 13 mounted on a frame of the snowmobile of FIG. 1

As can be seen in FIG. 17, a pipe 276 is connected to the outlet 272 of the auxiliary exhaust pipe 212. It is contemplated that the pipe 276 and the auxiliary exhaust pipe 212 could be integrally formed. From the auxiliary exhaust pipe 212, the pipe 276 extends rearward, through a side of the tunnel 18 and has its outlet 278 disposed inside the tunnel 18. It is contemplated that the auxiliary exhaust pipe 212 could not extend through the side of the tunnel 18 and that the outlet 278 of the pipe 276 could be disposed inside the engine compartment or outside the fairings 54. It is also contemplated that the pipe 276 could be omitted and that the outlet 272 of the auxiliary exhaust pipe 212 could be opened to the engine compartment, or that the auxiliary exhaust pipe 212 could extend through one of the fairings 54 and have its outlet 272 outside the engine compartment.

When the engine 24 is in operation and the main exhaust outlet 162 of the primary exhaust pipe 110 is not blocked or only partially blocked, exhaust gases flow from the pipe 154 into the primary exhaust pipe 210 via the inlet 258 of the primary exhaust pipe 210. Some of the exhaust gases flow into the auxiliary exhaust pipe 212, through the pipe 276 and are exhausted inside the tunnel 18. A remainder of the exhaust gases flow out of the outlet 262 of the primary exhaust pipe 210. When the outlet 262 is not blocked, a majority of the exhaust gases flow out of the outlet 262 of the primary exhaust pipe 210. When the outlet 262 is completely blocked, all of the exhaust gases flow through the auxiliary exhaust pipe 212 and the pipe 276.

It is contemplated that a check valve could be provided inside the auxiliary exhaust pipe 212. In such an embodiment, the check valve is normally closed such that all of the exhaust gases flow out of the main outlet 262 of the auxiliary exhaust pipe 212. The check valve opens when the main outlet 262 of the primary exhaust pipe 210 is completely or partially blocked such that exhaust gas pressure inside the primary exhaust pipe 210 increases to a predetermined level. Once the check valve opens, exhaust gases can flow through the auxiliary exhaust pipe 212.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A muffler for an exhaust system of an internal combustion engine comprising:
   a muffler body defining at least one chamber;
   an inlet pipe having an inlet and an outlet, the outlet being inside the muffler body, the outlet of the inlet pipe fluidly communicating with the at least one chamber;
   a primary exhaust pipe having an inlet inside the muffler body, a main outlet outside the muffler body, and at least one auxiliary outlet defined in a side of the primary exhaust pipe between the inlet and the main outlet of the primary exhaust pipe,
   the inlet of the primary exhaust pipe being spaced from the outlet the inlet pipe,
   the inlet of the primary exhaust pipe fluidly communicating with the at least one chamber, and
   the inlet of the primary exhaust pipe fluidly communicates with the outlet of the inlet pipe via the at least one chamber; and
   an auxiliary exhaust pipe fluidly communicating the at least one auxiliary outlet with an exterior of the muffler via an outlet of the auxiliary exhaust pipe separately from the main outlet.

2. The muffler of claim 1, wherein the at least one auxiliary outlet is disposed inside the muffler body.

3. The muffler of claim 1, wherein the auxiliary exhaust pipe is disposed around a portion of the primary exhaust pipe thereby defining a fluid passage between the primary exhaust pipe and the auxiliary exhaust pipe.

4. The muffler of claim 3, wherein the primary exhaust pipe extends from the auxiliary exhaust pipe and the main outlet is spaced from the outlet of the auxiliary exhaust pipe.

5. The muffler of claim 3, wherein the auxiliary exhaust pipe is disposed inside the muffler body.

6. The muffler of claim 5, wherein the outlet of the auxiliary exhaust pipe is defined in a wall of the muffler body; and
   wherein the primary exhaust pipe extends from the muffler body.

7. The muffler of claim 3, wherein the primary exhaust pipe has a portion defining a venturi; and
   wherein the at least one auxiliary outlet is defined in the venturi.

8. The muffler of claim 3, wherein the at least one auxiliary outlet is a plurality of auxiliary outlets.

9. The muffler of claim 1, wherein the auxiliary exhaust pipe extends from the at least one auxiliary outlet to the exterior of the muffler; and
   wherein an internal diameter of the outlet of the auxiliary exhaust pipe is smaller than an internal diameter of the main outlet.

10. The muffler of claim 1, further comprising a plate disposed inside the muffler body and defining the at least one chamber;
    wherein the at least one auxiliary outlet and the main outlet of the primary exhaust pipe are disposed on a same side of the plate; and
    wherein the inlet of the primary exhaust pipe and the at least one auxiliary outlet are disposed on opposite sides of the plate.

11. A vehicle comprising:
    an internal combustion engine having at least one exhaust port; and
    the muffler of claim 1, the inlet of the inlet pipe fluidly communicating with the at least one exhaust port.

12. The vehicle of claim 11, further comprising an engine compartment;
    wherein the engine and the outlet of the auxiliary exhaust pipe are disposed inside the engine compartment; and
    wherein the main outlet of the primary exhaust pipe is disposed outside the engine compartment.

13. A vehicle comprising:
    an internal combustion engine having at least one exhaust port;
    a primary exhaust pipe fluidly communicating with the at least one exhaust port, the primary exhaust pipe having:
       an inlet;
       a main outlet downstream of the inlet; and
       at least one auxiliary outlet defined in a side of the primary exhaust pipe between the inlet and the main outlet; and
    an auxiliary exhaust pipe disposed around a portion of the primary exhaust pipe thereby defining a fluid passage between the primary exhaust pipe and the auxiliary exhaust pipe, the fluid passage fluidly communicating the at least one auxiliary outlet with an exterior of the auxiliary exhaust pipe and of the primary exhaust pipe via an outlet of the auxiliary exhaust pipe separately from the main outlet.

14. The vehicle of claim 13, wherein the primary exhaust pipe extends from the auxiliary exhaust pipe and the main outlet is spaced from the outlet of the auxiliary exhaust pipe.

15. The vehicle of claim 13, wherein the primary exhaust pipe has a portion defining a venturi; and
    wherein the at least one auxiliary outlet is defined in the venturi.

16. The vehicle of claim 13, further comprising a muffler fluidly communicating with the at least one exhaust port of the engine, the muffler having a muffler body; and wherein the inlet of the primary exhaust pipe is disposed inside the muffler body.

17. The vehicle of claim 16, wherein the at least one auxiliary outlet is disposed inside the muffler body.

18. The vehicle of claim 16, wherein the auxiliary exhaust pipe is disposed inside the muffler body.

19. The vehicle of claim 18, wherein the outlet of the auxiliary exhaust pipe is defined in a wall of the muffler body; and wherein the primary exhaust pipe extends from the muffler body.

20. The vehicle of claim 13, further comprising an engine compartment;

wherein the engine and the outlet of the auxiliary exhaust pipe are disposed inside the engine compartment; and wherein the main exhaust outlet is disposed outside the engine compartment.

21. A vehicle comprising:

an internal combustion engine having at least one exhaust port;

a primary exhaust pipe fluidly communicating with the at least one exhaust port, the primary exhaust pipe having:
 an inlet;
 a main outlet downstream of the inlet; and
 at least one auxiliary outlet defined in a side of the primary exhaust pipe between the inlet and the main outlet; and an auxiliary exhaust pipe extends from the at least one auxiliary outlet, an internal diameter of an outlet of the auxiliary exhaust pipe being less than half of an internal diameter of the main outlet, the auxiliary exhaust pipe fluidly communicating the at least one auxiliary outlet with an exterior of the auxiliary exhaust pipe and of the primary exhaust pipe via the outlet of the auxiliary exhaust pipe separately from the main outlet.

22. The vehicle of claim 21, further comprising a muffler fluidly communicating with the at least one exhaust port of the engine, the muffler having a muffler body, wherein the inlet of the primary exhaust pipe is disposed inside the muffler body; and wherein the outlet of the auxiliary exhaust pipe and the main outlet are disposed outside the muffler body.

23. The vehicle of claim 21, further comprising:

a frame supporting the engine, the frame including a tunnel;

at least one ski operatively connected to the frame;

a drive track driven by the engine and disposed in part inside the tunnel;

wherein the outlet of the auxiliary exhaust pipe fluidly communicates with an inside of the tunnel.

* * * * *

UNITED STATES PATENT AND TRADEMARK OFFICE
CERTIFICATE OF CORRECTION

PATENT NO. : 9,188,048 B2  
APPLICATION NO. : 14/134645  
DATED : November 17, 2015  
INVENTOR(S) : Yvon Bedard Page 1 of 1

It is certified that error appears in the above-identified patent and that said Letters Patent is hereby corrected as shown below:

In the Claims

Claim 1, Column 11, line 49, "outline the inlet pipe" should read -- outline of the inlet pipe --

Signed and Sealed this
Twenty-sixth Day of April, 2016

Michelle K. Lee
*Director of the United States Patent and Trademark Office*